United States Patent
Solow et al.

(10) Patent No.: US 11,481,517 B2
(45) Date of Patent: Oct. 25, 2022

(54) SYSTEM AND METHOD FOR DETERMINING PERMISSION PROFILES FOR COMPUTER EXECUTABLE FUNCTIONS

(71) Applicant: Check Point Serverless Security Ltd., Tel Aviv (IL)

(72) Inventors: Hillel Solow, Beit Shermesh (IL); Shali Mor, Modiin (IL); Itay Harush, Jerusalem (IL); Benny Zemmour, Jerusalem (IL); Tsion Gonen, Baltimore, MD (US)

(73) Assignee: CHECK POINT SERVERLESS SECURITY LTD., Tel Aviv (IL)

( * ) Notice: Subject to any disclaimer, the term of this patent is extended or adjusted under 35 U.S.C. 154(b) by 285 days.

(21) Appl. No.: 16/876,243

(22) Filed: May 18, 2020

(65) Prior Publication Data

US 2020/0364360 A1 Nov. 19, 2020

Related U.S. Application Data

(60) Provisional application No. 62/848,613, filed on May 16, 2019.

(51) Int. Cl.
*G06F 21/00* (2013.01)
*G06F 21/62* (2013.01)

(52) U.S. Cl.
CPC .... *G06F 21/629* (2013.01); *G06F 2221/2141* (2013.01)

(58) Field of Classification Search
CPC .................. G06F 21/629; G06F 2221/2141
See application file for complete search history.

(56) References Cited

U.S. PATENT DOCUMENTS

| | | | | |
|---|---|---|---|---|
| 9,507,943 | B1* | 11/2016 | Allen | G06F 21/56 |
| 10,148,701 | B1* | 12/2018 | Hecht | G06F 9/455 |
| 10,445,499 | B1* | 10/2019 | Xu | G06F 16/285 |
| 10,623,435 | B2* | 4/2020 | Jevans | G06F 21/51 |
| 2005/0262487 | A1* | 11/2005 | Pistoia | G06F 9/468 |
| | | | | 717/127 |
| 2007/0006314 | A1* | 1/2007 | Costa | G06F 21/577 |
| | | | | 726/25 |
| 2008/0201760 | A1 | 8/2008 | Centonze et al. | |
| 2010/0031353 | A1 | 2/2010 | Thomas et al. | |
| 2012/0167061 | A1* | 6/2012 | Kirovski | G06F 21/125 |
| | | | | 717/132 |
| 2013/0067531 | A1 | 3/2013 | Deakin et al. | |
| 2013/0067532 | A1* | 3/2013 | Deakin | G06F 21/00 |
| | | | | 726/1 |
| 2017/0068810 | A1* | 3/2017 | Yao | G06F 21/51 |
| 2017/0116415 | A1 | 4/2017 | Stopel et al. | |

(Continued)

OTHER PUBLICATIONS

Google Scholar search results (Year: 2022).*

*Primary Examiner* — Tri M Tran
(74) *Attorney, Agent, or Firm* — Mark M. Friedman (57) ABSTRACT

Systems, methods, and software products, determine permission profiles for computer executable functions (functions). The systems, methods and software products, utilize both static analysis and dynamic analysis, in order to determine the minimal set of permissions based on the interrelations between these two analysis methods, i.e., static analysis, and dynamic analysis, to determine the permission profiles for computer executable functions (functions).

20 Claims, 4 Drawing Sheets

(56) References Cited

U.S. PATENT DOCUMENTS

| | | | |
|---|---|---|---|
| 2018/0039779 A1* | 2/2018 | Li | G06F 21/566 |
| 2019/0007458 A1* | 1/2019 | Shulman | H04L 63/1433 |
| 2020/0004963 A1* | 1/2020 | Zheng | G06F 21/53 |
| 2020/0358803 A1* | 11/2020 | Roelofs | H04L 63/1416 |

* cited by examiner

SYSTEM AND METHOD FOR DETERMINING PERMISSION PROFILES FOR COMPUTER EXECUTABLE FUNCTIONS

CROSS REFERENCES TO RELATED APPLICATIONS

This application is related to and claims priority from commonly owned U.S. Provisional Patent Application Ser. No. 62/848,613, entitled: System and Method For Determining Permission Profiles for Computer Executable Functions, filed on May 16, 2019, the disclosure of which is incorporated by reference in its entirety herein.

TECHNICAL FIELD

The disclosed subject matter relates to a system and method for determining permission profiles for computer executable functions.

BACKGROUND

Computer executable functions are comprised of lines of code that in some cases require permissions when using various resources to complete their tasks. These resources can include: databases, files, directories, network connections, sub-processes, various hardware elements, Application Programming Interface (API) calls, and other resources used by the computer executable function. The permissions can limit the access rights of the lines of codes to the resources. For example, a code segment accessing a specific file can access it with read permissions, write permissions or execute permissions. Each of the permissions grant the code segment with different privileges regarding operations on that specific file.

In some cases, the computer executable function is executing under a specific user or group of users and the permissions the computer executable function has to access resources is derived from the permissions of the specific user or group of users.

One of the goals of securing a computer environment that includes one or more computer executable functions is to set a minimal set of permissions for each computer executable function. This will ensure that even in a case of an intruder taking control of the computer executable function and misusing its code—the damage it can cause to other resources in the computer environment is minimal and confined.

Current solutions for determining the minimal set of permissions for the computer executable function utilize static analysis methods, by statically scanning the code, or dynamic analysis methods, by learning the behavior of the code in runtime. The static analysis methods lack accuracy as many of the actual behaviors of the code depend on parameters received in run-time. The dynamic analysis method lacks completeness as some behaviors of the code can occur seldomly.

SUMMARY

Embodiments of the presently disclosed subject matter are directed to systems, methods, and software products, for determining permission profiles for computer executable functions (functions). The systems, methods, and software products, utilize both static analysis and dynamic analysis, in order to determine the minimal set of permissions based on the inter-relations between these two analysis methods, i.e., static analysis, and dynamic analysis, to determine the permission profiles for computer executable functions (functions). Throughout this document, when making reference to "determining" (and all of its tenses and forms) and/or "deducing" (and all of its tenses and forms) permission profiles and/or permissions, from both static analysis of computer executable functions (functions) and/or dynamic analysis of computer executable functions (functions), these terms include, for example, "creating", "setting", "defining", and "establishing", the permission profiles and/or permissions, except where specifically indicated.

In accordance with a first aspect of the presently disclosed subject matter, there is provided a system for determining permission profiles for computer executable functions, the system comprising a processing resource configured to: provide a computer executable function comprised of lines of code, the computer executable function's behavior depends on one or more parameters serving as input to the computer executable function; perform a static analysis of the computer executable function to identify first permissions required for operation of the computer executable function, wherein the static analysis is performed without executing the computer executable function and irrespectively of values of the parameters; perform a dynamic analysis of the computer executable function by executing the computer executable function a plurality of times, each time with a distinct combination of execution values of the parameters, to identify second permissions required for operation of the computer executable function that are not identified by performing the static analysis; and determine a permission profile for the computer executable function, the permission profile includes the first permissions and the second permissions and does not include other permissions, other than the first permissions and the second permissions.

In some cases, the processing resource is further configured to set the permissions of the computer executable function in accordance with the permission profile, by assigning the computer executable function with the first permissions and with the second permissions and removing any other permissions assigned to the computer executable function other than the first permissions and the second permissions, if any.

In some cases, the computer executable function comprises a plurality of execution paths selectable in accordance with the values of one or more of the parameters, each execution path includes execution of a distinct subset of the lines of code, and wherein the distinct combination of execution values of the parameters is determined so that executing the computer executable function results in execution of the execution paths whose static analysis cannot indefinitely identify all required permission for execution of the computer executable function.

In some cases, using the distinct combination of execution values of the parameters that is determined so that executing the computer executable function results in execution of the execution paths whose static analysis cannot indefinitely identify all required permission for execution of the computer executable function results in reducing a number of executions of the computer executable function as part of the dynamic analysis.

In some cases, the dynamic analysis is performed by executing the computer executable function in a test environment.

In some cases, the dynamic analysis is performed by executing the computer executable function in an operational environment.

In some cases, the processing resource is further configured to associate detected behaviors of the computer executable function with risk scores, so that a first risk score of detected behaviors detected by the dynamic analysis and not detected by the static analysis is higher than a second risk score of detected behaviors detected by the static analysis.

In some cases, the processing resource is further configured to obtain risk scores associated with respective behaviors of functions, and wherein the permission profile is determined utilizing the risk scores.

In some cases, the permission profile does not include at least one given permission of the first permissions or the second permissions, the given permission resulting from a detected behavior of the computer executable function that is associated with a given risk score of the risk scores that is higher than a threshold.

In some cases, the permission profile does not include at least one given permission identified (a) as part of the first permissions and not identified as part of the second permissions, or (b) as part of the second permissions and not identified as part of the first permissions, wherein the given permission is associated with a behavior that is associated with a risk score higher than a threshold.

In some cases, the computer executable function comprises a plurality of execution paths selectable in accordance with the values of one or more of the parameters, each execution path includes execution of a distinct subset of the lines of code, and wherein a subset of the execution paths are new execution paths that did not exist on a previous version of the computer executable function or that changed with respect to the previous version of the computer executable function, and wherein the distinct combination of execution values of the parameters is determined so that executing the computer executable function results in execution of the subset of execution paths.

In some cases, the distinct combination of execution values of the parameters is determined so that executing the computer executable function results in execution of execution paths of the subset of execution paths whose static analysis cannot indefinitely identify all required permission for execution of the computer executable function.

In some cases, the computer executable function is a serverless function executable on a Function as a Service (FaaS) platform.

In some cases, the computer executable function is a container executable on a managed containers environment.

In accordance with a second aspect of the presently disclosed subject matter, there is provided a method for determining permission profiles for computer executable functions, the method comprising: providing, by a processing resource, a computer executable function comprised of lines of code, the computer executable function's behavior depends on one or more parameters serving as input to the computer executable function; performing, by the processing resource, a static analysis of the computer executable function to identify first permissions required for operation of the computer executable function, wherein the static analysis is performed without executing the computer executable function and irrespectively of values of the parameters; performing, by the processing resource, a dynamic analysis of the computer executable function by executing the computer executable function a plurality of times, each time with a distinct combination of execution values of the parameters, to identify second permissions required for operation of the computer executable function that are not identified by performing the static analysis; and determining, by the processing resource, a permission profile for the computer executable function, the permission profile includes the first permissions and the second permissions and does not include other permissions, other than the first permissions and the second permissions.

In some cases, the method further comprising setting, by the processing resource, the permissions of the computer executable function in accordance with the permission profile, by assigning the computer executable function with the first permissions and with the second permissions and removing any other permissions assigned to the computer executable function other than the first permissions and the second permissions, if any.

In some cases, the computer executable function comprises a plurality of execution paths selectable in accordance with the values of one or more of the parameters, each execution path includes execution of a distinct subset of the lines of code, and wherein the distinct combination of execution values of the parameters is determined so that executing the computer executable function results in execution of the execution paths whose static analysis cannot indefinitely identify all required permission for execution of the computer executable function.

In some cases, the distinct combination of execution values of the parameters that is determined so that executing the computer executable function results in execution of the execution paths whose static analysis cannot indefinitely identify all required permission for execution of the computer executable function results in reducing a number of executions of the computer executable function as part of the dynamic analysis.

In some cases, the dynamic analysis is performed by executing the computer executable function in a test environment.

In some cases, the dynamic analysis is performed by executing the computer executable function in an operational environment.

In some cases, the method further comprising associating, by the processing resource, detected behaviors of the computer executable function with risk scores, so that a first risk score of detected behaviors detected by the dynamic analysis and not detected by the static analysis is higher than a second risk score of detected behaviors detected by the static analysis.

In some cases, the method further comprising obtaining, by the processing resource, risk scores associated with respective behaviors of functions, and wherein the permission profile is determined utilizing the risk scores.

In some cases, the permission profile does not include at least one given permission of the first permissions or the second permissions, the given permission resulting from a detected behavior of the computer executable function that is associated with a given risk score of the risk scores that is higher than a threshold.

In some cases, the permission profile does not include at least one given permission identified (a) as part of the first permissions and not identified as part of the second permissions, or (b) as part of the second permissions and not identified as part of the first permissions, wherein the given permission is associated with a behavior that is associated with a risk score higher than a threshold.

In some cases, the computer executable function comprises a plurality of execution paths selectable in accordance with the values of one or more of the parameters, each execution path includes execution of a distinct subset of the lines of code, and wherein a subset of the execution paths are new execution paths that did not exist on a previous version of the computer executable function or that changed with respect to the previous version of the computer executable function, and wherein the distinct combination of execution values of the parameters is determined so that executing the computer executable function results in execution of the subset of execution paths.

In some cases, the distinct combination of execution values of the parameters is determined so that executing the computer executable function results in execution of execution paths of the subset of execution paths whose static analysis cannot indefinitely identify all required permission for execution of the computer executable function.

In some cases, the computer executable function is a serverless function executable on a Function as a Service (FaaS) platform.

In some cases, the computer executable function is a container executable on a managed containers environment.

In accordance with a third aspect of the presently disclosed subject matter, there is provided a non-transitory computer readable storage medium having computer readable program code embodied therewith, the computer readable program code, executable by at least one processor of a computer to perform a method of: providing, by a processing resource, a computer executable function comprised of lines of code, the computer executable function's behavior depends on one or more parameters serving as input to the computer executable function; performing, by the processing resource, a static analysis of the computer executable function to identify first permissions required for operation of the computer executable function, wherein the static analysis is performed without executing the computer executable function and irrespectively of values of the parameters; performing, by the processing resource, a dynamic analysis of the computer executable function by executing the computer executable function a plurality of times, each time with a distinct combination of execution values of the parameters, to identify second permissions required for operation of the computer executable function that are not identified by performing the static analysis; and determining, by the processing resource, a permission profile for the computer executable function, the permission profile includes the first permissions and the second permissions and does not include other permissions, other than the first permissions and the second permissions.

Another aspect of the disclosed subject matter includes a computer system for determining permission profiles for computer executable functions. The system comprises: a non-transitory storage medium for storing computer components; and, a computerized processor for executing the computer components. The computer components comprise at least one module for: performing a static analysis of a computer executable function to identify first permissions required for operation of the computer executable function, wherein the static analysis is performed without executing the computer executable function and irrespectively of values of the parameters; performing a dynamic analysis of the computer executable function by executing the computer executable function a plurality of times, each time with a distinct combination of execution values of the parameters, to identify second permissions required for operation of the computer executable function that are not identified by performing the static analysis; and, determining, e.g. a permission profile for the computer executable function, the permission profile including the first permissions and the second permissions.

In some cases, the permission profile does not include permissions other than the first permissions and the second permissions.

Another aspect of the disclosed subject matter includes a method for determining permission profiles for computer executable functions. The method comprises: performing, by a processing resource (e.g., a processor), a static analysis of a computer executable function to identify first permissions required for operation of the computer executable function, wherein the static analysis is performed without executing the computer executable function and irrespectively of values of the parameters; performing, by the processing resource, a dynamic analysis of the computer executable function by executing the computer executable function a plurality of times, each time with a distinct combination of execution values of the parameters, to identify second permissions required for operation of the computer executable function that are not identified by performing the static analysis; and, determining, by the processing resource, a permission profile for the computer executable function, the permission profile including the first permissions and the second permissions.

In some cases, the permission profile does not include permissions other than the first permissions and the second permissions.

Another aspect of the disclosed subject matter includes a non-transitory computer readable storage medium (e.g., software product) having computer readable program code embodied therewith, the computer readable program code, executable by at least one processor of a computer to perform steps. The steps include: performing a static analysis of a computer executable function to identify first permissions required for operation of the computer executable function, wherein the static analysis is performed without executing the computer executable function and irrespectively of values of the parameters; performing a dynamic analysis of the computer executable function by executing the computer executable function a plurality of times, each time with a distinct combination of execution values of the parameters, to identify second permissions required for operation of the computer executable function that are not identified by performing the static analysis; and, determining a permission profile for the computer executable function, the permission profile includes the first permissions and the second permissions.

In some cases, the permission profile does not include permissions other than the first permissions and the second permissions.

Unless otherwise defined herein, all technical and/or scientific terms used herein have the same meaning as commonly understood by one of ordinary skill in the art to which the disclosed subject matter pertains. Although methods and materials similar or equivalent to those described herein may be used in the practice or testing of embodiments of the disclosed subject matter, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION OF THE DRAWINGS

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "determining", "performing", "setting", "obtaining", "associating", "establishing", "creating", "defining", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium (also known as a "non-transitory storage medium"). The term "non-transitory" is used herein to exclude transitory, propagating signals, but to otherwise include any volatile or non-volatile computer memory technology suitable to the application.

As used herein, the phrase "for example", "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
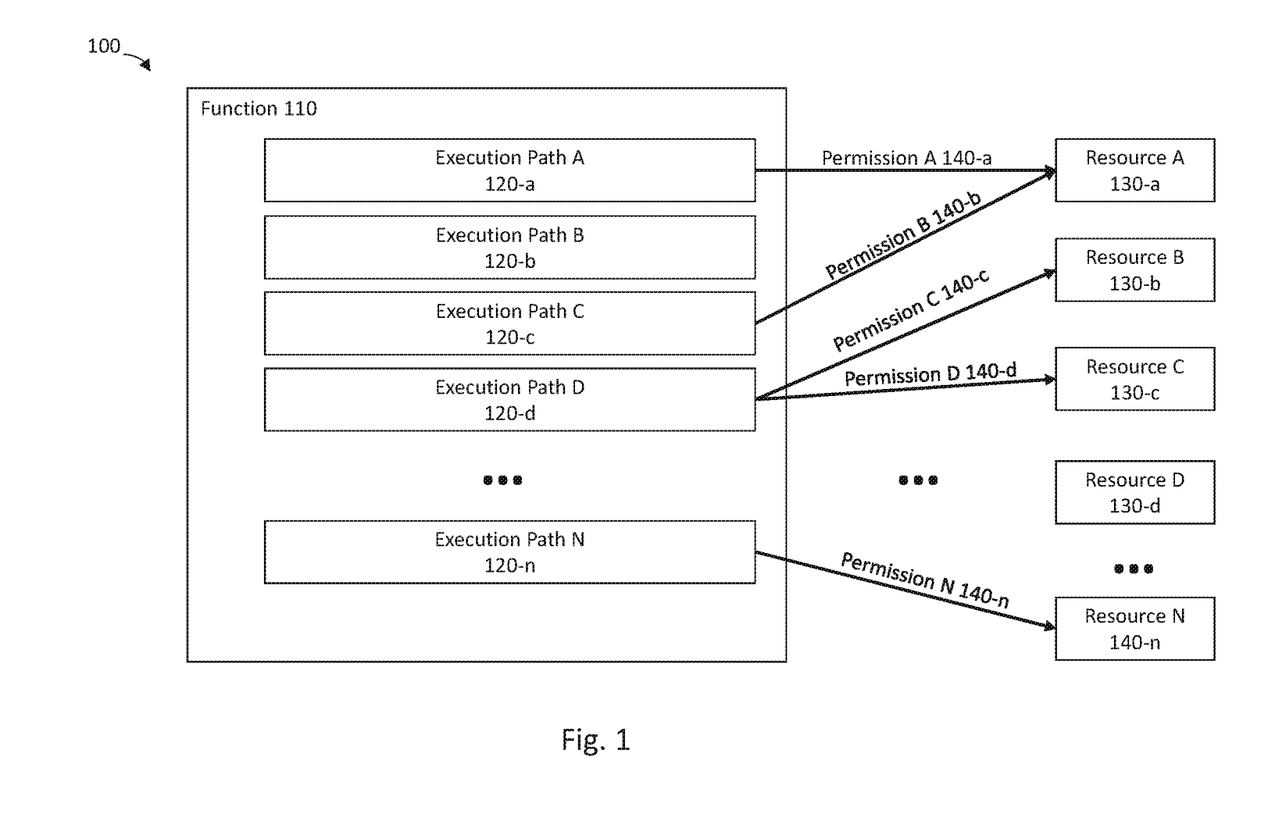
FIG. 1 is a schematic illustration of an example environment for permission profile determination and management for computer executable functions, in accordance with the presently disclosed subject matter.
Figure 2:
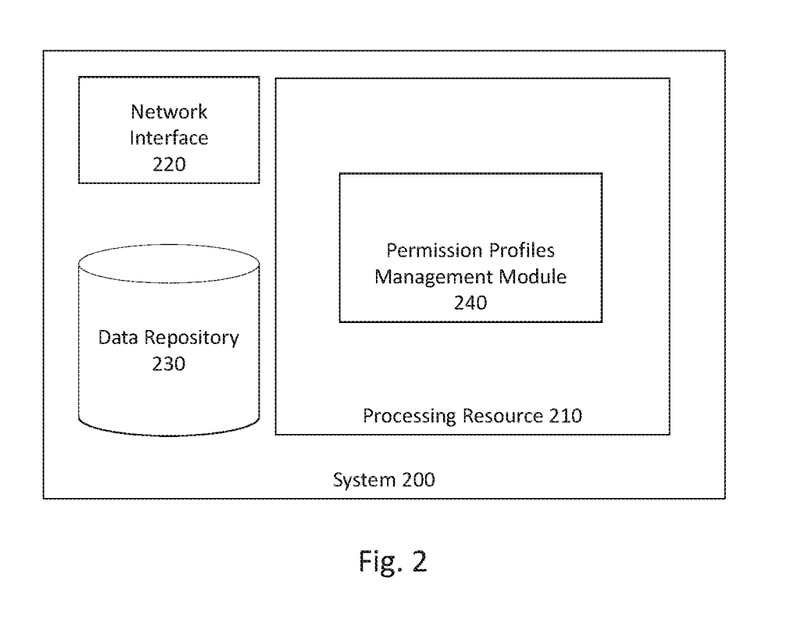
FIG. 2 is a block diagram schematically illustrating one example of a system for determining and managing permission profiles for computer executable functions, in accordance with the presently disclosed subject matter.
Figure 3:
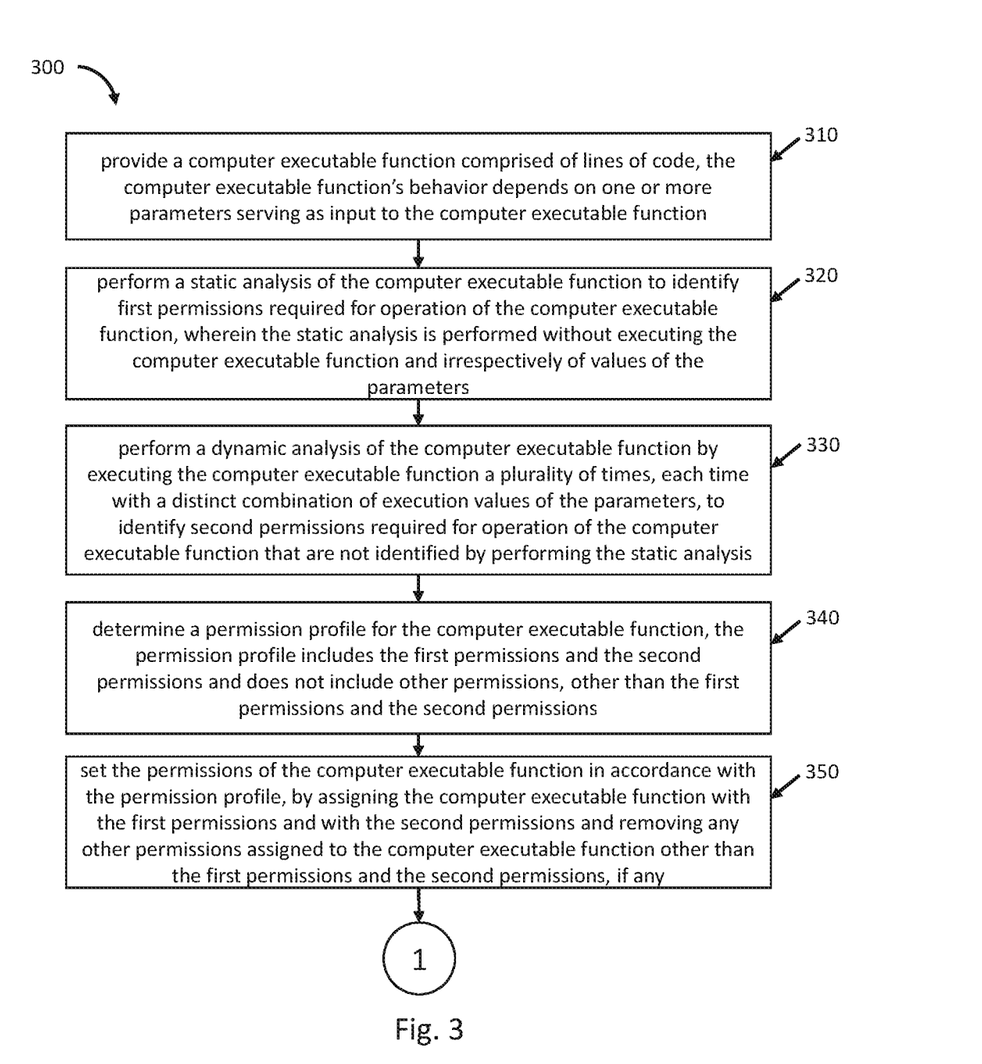
FIG. 3 is a flowchart illustrating one example of a sequence of operations carried out for determining and managing permission profiles for computer executable functions, in accordance with the presently disclosed subject matter.
Figure 4:
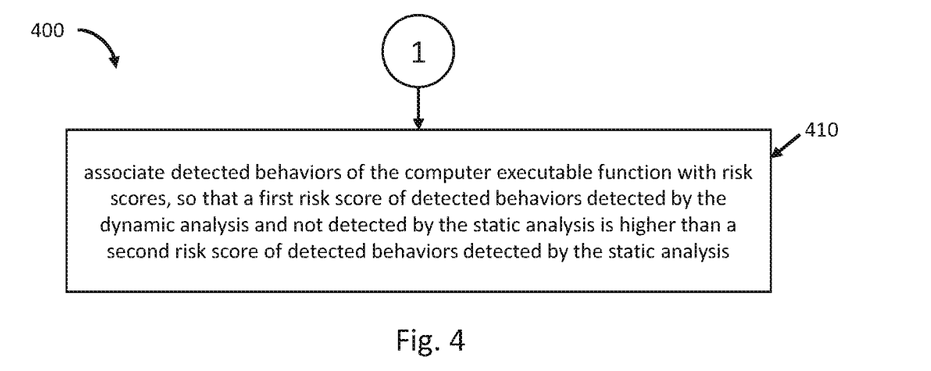
FIG. 4 is a flowchart illustrating one example of a sequence of operations carried out for associating behaviors of a computer executable function with risk scores, in accordance with the presently disclosed subject matter; and, FIG. 5 is a flowchart illustrating one example of a sequence of operations carried out for determining permission profiles for computer executable functions based by utilizing risk scores, in accordance with the presently disclosed subject matter.
Figure 5:
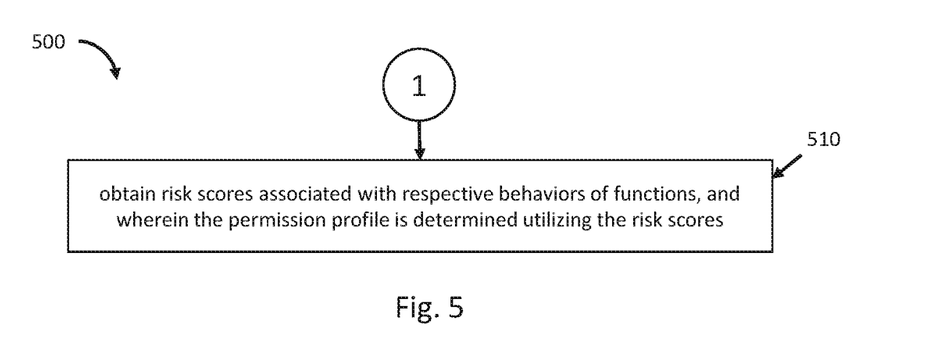

In embodiments of the presently disclosed subject matter, fewer, more and/or different stages than those shown in FIG. 3-5 may be executed. In embodiments of the presently disclosed subject matter one or more stages illustrated in FIG. 3-5 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method may, for example, be applied to a system capable of executing the method and may, for example, be applied to a non-transitory computer readable medium that stores instructions that once executed by a computer result in the execution of the method.

Any reference in the specification to a system may, for example, be applied to a method that may be executed by the system and may, for example, be applied to a non-transitory computer readable medium that stores instructions that may be executed by the system.

Any reference in the specification to a non-transitory computer readable medium may, for example, be applied to a system capable of executing the instructions stored in the non-transitory computer readable medium and may, for example, be applied to a method that may be executed by a computer that reads the instructions stored in the non-transitory computer readable medium.

Bearing this in mind, attention is drawn to FIG. 1, a schematic illustration of an example environment for permission profile determination, including, for example, creating, setting, defining, and/or establishing permission profiles for computer executable functions, and management for computer executable functions, in accordance with the presently disclosed subject matter.

According to the presently disclosed subject matter, environment 100, includes one or more functions 110. Each function 110 is comprised of lines of code that can be executed by a computer. It is to be noted that the terms function 110 and computer executed function 110 are used herein interchangeably.

Function 110 can be executed on a computer, laptop, smart phone, server or any other computation device capable of executing function 110. A given function 110 can be executed by a direct operation of a user (e.g., via a user interface of the computation device) or indirectly by another function 110 executing the given function 110. Function 110 can execute on a local computation device or remotely on a computation device that is on a network. In some cases, function 110 can be executed as a cloud computing service on a Function as a Service (FaaS) platform (e.g. Amazon Web Services (AWS) Lambda, Google Cloud Functions, Microsoft Azure Functions and others). In other cases, function 110 can form a managed container that can run on a managed containers environment (e.g., AWS Fargate, Iron.io's IronWorker and others).

Each function 110 can have one or more input parameters. The input parameters are provided to the function 110 when executed. The function's 110 behavior during execution can depend on the input parameters, as well as the output of the execution of function 110.

Function 110 can include one or more execution paths (i.e. one or more of: execution path A 120-*a*, execution path B 120-*b*, execution path C 120-*c*, execution path D 120-*d*, . . . , execution path N 120-*n*) within the function' 110 lines of code. Each execution path (i.e. execution path A 120-*a*, execution path B 120-*b*, execution path C 120-*c*, execution path D 120-*d*, . . . , execution path N 120-*n*) includes execution of a distinct subset of the lines of code of function 110. The execution paths (i.e. one or more of: execution path A 120-*a*, execution path B 120-*b*, execution path C 120-*c*, execution path D 120-*d*, . . . , execution path N 120-*n*) are selectable in accordance with the values of the input parameters.

The distinct subset of the lines of code of function 110 within each execution path (i.e. one or more of: execution path A 120-*a*, execution path B 120-*b*, execution path C 120-*c*, execution path D 120-*d*, . . . , execution path N 120-*n*) can utilize one or more resource (i.e. one or more of: resource A 130-*a*, resource B 130-*b*, resource C 130-*c*, resource D 130-*d*, . . . , resource N 130-*n*) to complete their tasks. These resources (i.e. one or more of: resource A 130-*a*, resource B 130-*b*, resource C 130-*c*, resource D 130-*d*, . . . , resource N 130-*n*) can include: databases, files, directories, network connections, sub-processes, various hardware elements, Application Programming Interface (API) calls, and other resources used by function 110.

Each resource (i.e. A 130-*a*, resource B 130-*b*, resource C 130-*c*, resource D 130-*d*, . . . , resource N 130-*n*) is accessed by an execution path in accordance with a permission (i.e. permission A 140-*a*, permission B 140-*b*, permission C 140-*c*, permission D 140-*d*, . . . , permission N 140-*n*). The permissions (i.e. one or more of: permission A 140-*a*, permission B 140-*b*, permission C 140-*c*, permission D 140-*d*, . . . , permission N 140-*n*) can limit the access rights of the lines of codes of the execution path (i.e. execution path A 120-*a*, execution path B 120-*b*, execution path C 120-*c*, execution path D 120-*d*, . . . , execution path N 120-*n*) to the resource (i.e. one or more of: resource A 130-*a*, resource B 130-*b*, resource C 130-*c*, resource D 130-*d*, . . . , resource N 130-*n*). For example, a code segment of a given execution path (i.e. execution path A 120-*a*, execution path B 120-*b*, execution path C 120-*c*, execution path D 120-*d*, . . . , execution path N 120-*n*) accessing a specific file can access it with read permissions, write permissions and/or execute permissions. Each of the permissions (i.e. one or more of: permission A 140-*a*, permission B 140-*b*, permission C 140-*c*, permission D 140-*d*, . . . , permission N 140-*n*) grant the execution path (i.e. execution path A 120-*a*, execution path B 120-*b*, execution path C 120-*c*, execution path D 120-*d*, . . . , execution path N 120-*n*) with different privileges regarding operations on that specific file.

In a non-limiting illustrated example in FIG. 1, function 110 includes various execution paths (i.e., one or more of: execution path A 120-*a*, execution path B 120-*b*, execution path C 120-*c*, execution path D 120-*d*, . . . , execution path N 120-*n*). Some of the execution paths (i.e., one or more of: execution path A 120-*a*, execution path B 120-*b*, execution path C 120-*c*, execution path D 120-*d*, . . . , execution path N 120-*n*) utilize resources (i.e. one or more of: resource A 130-*a*, resource B 130-*b*, resource C 130-*c*, resource D 130-*d*, . . . , resource N 130-*n*) in accordance with a specific permission (i.e. one or more of: permission A 140-*a*, permission B 140-*b*, permission C 140-*c*, permission D 140-*d*, . . . , permission N 140-*n*) in order to perform their tasks. For example, execution path A 120-*a* utilizes resource A 130-*a*, a table in a database in the example, in accordance with permission A 140-*a*, which is a SELECT permission, allowing execution path A 120-*a* to read the table. The same table (resource A 130-*a*) is utilized by execution path C 120-*c* in accordance with permission B 140-*b*, which is an INSERT permission, allowing execution path C 120-*c* to insert new data into the table. Function 110 typically requires a permission profile that includes these permissions in order to execute correctly.

In order to secure the computer environment wherein one or more functions 110 execute, there is a need to determine a minimal permission profile for each of the functions 110. The minimal permission profile includes only the permissions (i.e. one or more of: permission A 140-*a*, permission B 140-*b*, permission C 140-*c*, permission D 140-*d*, . . . , permission N 140-*n*), which the function 110 requires, in order to operate correctly and, for example, not more than that. This is achieved by performing static analysis and dynamic analysis on function 110, in order to determine the minimal set of permissions (i.e. one or more of: permission A 140-*a*, permission B 140-*b*, permission C 140-*c*, permission D 140-*d*, . . . , permission N 140-*n*) for the function 110, based on the inter-relations between the results of these two analysis methods, as further detailed herein, with respect to FIG. 3.

Turning to FIG. 2, there is shown a block diagram schematically illustrating one example of a system for determining and managing, permission profiles for computer executable functions, in accordance with the presently disclosed subject matter.

According to certain examples of the presently disclosed subject matter, system 200 can comprise, or be otherwise associated with, a data repository 230 (e.g. a database, a storage system, a memory including Read Only Memory—ROM, Random Access Memory—RAM, or any other type of memory, etc.) configured to store data, including, for example, function 110 information (i.e. the lines of code, input parameters, previous versions of function 110, etc.), resources (i.e. one or more of: resource A 130-*a*, resource B 130-*b*, resource C 130-*c*, resource D 130-*d*, . . . , resource N 130-*n*) addresses, permissions (i.e. one or more of: permission A 140-*a*, permission B 140-*b*, permission C 140-*c*, permission D 140-*d*, . . . , permission N 140-*n*), information required to analyze code, etc. Data repository 230 can be further configured to enable retrieval and/or update and/or deletion of the stored data. It is to be noted that in some cases, data repository 230 can be distributed, while the system 200 has access to the information stored thereon, e.g., via a wired or wireless network, to which the system 200 is able to connect to.

It is to be noted that the terms system 200 and shared hardware and communication resources management system 200 are used herein interchangeably.

Shared hardware and communication resources management system 200 may further comprise a network interface 220 (e.g. a network card, a WiFi client, a LiFi client, 3G/4G client, or any other network connection enabling component), enabling system 200 to communicate over a wired or wireless network with one or more functions 110 (e.g. through a platform or environment that stores one or more functions 110). In some cases, at least some of the connections are over the Internet. In other cases, at least some of the connections are to a FaaS platform and/or to a managed containers environment.

System 200 further comprises a processing resource 210. Processing resource 230 can be one or more processing units (e.g. central processing units), processors, including hardware processors, microprocessors, microcontrollers (e.g. microcontroller units (MCUs)) or any other computing devices or modules, including multiple and/or parallel and/or distributed processing units, which are adapted to independently or cooperatively process data for controlling relevant system 200 resources and for enabling operations related to system 200 resources.

The processing resource 210 can contain the following module: permission profiles management module 240.

Permission profiles management module 240 can be configured to provide a computer executable function 110, perform static analysis and dynamic analysis, on the computer executable function 110, determine a permission profile for the computer executable function 110 and set the permissions (i.e. one or more of: permission A 140-a, permission B 140-b, permission C 140-c, permission D 140-d, . . . , permission N 140-n) of the computer executable function 110 accordingly, as further detailed herein, with reference to FIGS. 3, 4 and 5.

Attention is drawn to FIG. 3, a flowchart illustrating one example of a sequence of operations carried out for determining and managing permission profiles for computer executable functions, in accordance with the presently disclosed subject matter.

According to certain examples of the presently disclosed subject matter, permission profiles determination and management system 200 can be configured to perform a permission profiles determination and management process 300, e.g. by permission profiles determination and management system 200 utilizing the permission profiles management module 240.

As detailed above, permission profiles determination and management system 200 can be used for deducing or otherwise identifying and/or determining, minimal permissions (i.e., one or more of: permission A 140-a, permission B 140-b, permission C 140-c, permission D 140-d, . . . , permission N 140-n) required for a plurality of code lines of functions 110. This can be achieved by a behavioral whitelisting analysis method that combines static and dynamic analysis of computer executable functions 110 to accurately and quickly deduce the minimal required permissions (i.e. one or more of: permission A 140-a, permission B 140-b, permission C 140-c, permission D 140-d, . . . , permission N 140-n) of the code lines.

For this purpose, permission profiles determination and management system 200 can be configured to provide, or have access to, a computer executable function 110 comprised of lines of code. The computer executable function's 110 behavior depends on one or more parameters serving as input to the computer executable function 110 (block 310).

Based on the obtained computer executable function 110, permission profiles determination and management system 200 can be configured to perform a static analysis of the computer executable function 110 to identify first permissions (i.e. one or more of: permission A 140-a, permission B 140-b, permission C 140-c, permission D 140-d, . . . , permission N 140-n) required for operation of the computer executable function 110, wherein the static analysis is performed without executing the computer executable function 110 and irrespectively of values of the parameters (block 320).

In some cases, the static analysis is performed by code path emulation of the computer executable function 110. Code path emulation analyzes which behaviors (such as: API calls, network connections, sub-processes, file access, statistics regarding behavior of the function) are expected to be employed by the function 110 by emulating the expected behavior of the function at run-time. This analysis is achieved by learning the various execution paths (i.e. one or more of: execution path A 120-a, execution path B 120-b, execution path C 120-c, execution path D 120-d, . . . , execution path N 120-n) of the computer executable function 110, analyzing what are the resources (i.e. one or more of: resource A 130-a, resource B 130-b, resource C 130-c, resource D 130-d, . . . , resource N 130-n) utilized by the execution paths (i.e. one or more of: execution path A 120-a, execution path B 120-b, execution path C 120-c, execution path D 120-d, . . . , execution path N 120-n) and identify the first permissions (i.e. one or more of: permission A 140-a, permission B 140-b, permission C 140-c, permission D 140-d, . . . , permission N 140-n) required for the operation of execution paths (i.e. one or more of: execution path A 120-a, execution path B 120-b, execution path C 120-c, execution path D 120-d, . . . , execution path N 120-n) of the computer executable function 110.

In some cases, the static analysis can employ also a naïve static analysis, achieved by a lexical analysis of the lines of code of the computer executable function 110. In these cases, the static analysis can employ both naïve static analysis and code path emulation static analysis for deducing the minimal permissions (i.e. one or more of: permission A 140-a, permission B 140-b, permission C 140-c, permission D 140-d, . . . , permission N 140-n) required for the computer executable function 110, for example by a union of the permissions (i.e. one or more of: permission A 140-a, permission B 140-b, permission C 140-c, permission D 140-d, . . . , permission N 140-n) determined by the naïve static analysis and code path emulation static analysis.

A non-limiting example of static analysis can be analyzing the lines of code of execution path A 120-a to deduce that resource A 130-a, which is a database table, is utilized by these lines of code and identifying that resource A 130-a is utilized in accordance to permission A 140-a, which is a SELECT permission, allowing execution path A 120-a to read the table.

Based on the obtained computer executable function 110, permission profiles determination and management system 200 can be configured to perform a dynamic analysis of the computer executable function 110 by executing the computer executable function 110 a plurality of times, each time with a distinct combination of execution values of the parameters, to identify second permissions (i.e. one or more of: permission A 140-a, permission B 140-b, permission C 140-c, permission D 140-d, . . . , permission N 140-n)

required for operation of the computer executable function 110 that are not identified by performing the static analysis (block 330).

In some cases, the dynamic analysis of the computer executable function 110 is performed by executing the function 110 within a computerized environment and analyzing the actual behavior of the function. In some cases, the dynamic analysis is performed by executing the computer executable function 110 within a computerized environment that is a test environment. The test environment can be an existing test environment or a test environment specifically built for the dynamic analysis of the computer executable function 110.

In some cases, the dynamic analysis is performed by executing the computer executable function 110 in an operational environment. The operational environment may be, for example, a production environment where the computer executable function 110 is planned to be executed. In these cases, the production environment is a clean environment wherein the computer executable function 110 is not under attack of a hacker and is behaving as it should. In some cases, the execution of the computer executable function 110 in the production environment is sanitized by ignore anything that happened less than a threshold number of times.

In some cases, the dynamic analysis of the computer executable function 110 is directed in accordance to the results of the static analysis of the computer executable function 110. In these cases, the dynamic analysis is directed to specific execution paths (i.e., one or more of: execution path A 120-a, execution path B 120-b, execution path C 120-c, execution path D 120-d, . . . , execution path N 120-n) whose static analysis cannot indefinitely identify all required permissions (i.e. one or more of: permission A 140-a, permission B 140-b, permission C 140-c, permission D 140-d, . . . , permission N 140-n) for execution of the computer executable function 110. This is done by selecting distinct combination of execution values of the input parameters so that executing the computer executable function 110 results in execution of these specific execution paths (i.e., one or more of: execution path A 120-a, execution path B 120-b, execution path C 120-c, execution path D 120-d, . . . , execution path N 120-n). It is to be noted that this results in reducing the number of executions of the computer executable function 110 as part of the dynamic analysis in comparison to the number of executions of the computer executable function 110 that would have been required as part of the dynamic analysis without directing the dynamic analysis to the specific execution paths (i.e. one or more of: execution path A 120-a, execution path B 120-b, execution path C 120-c, execution path D 120-d, . . . , execution path N 120-n). This results in the overall process being more efficient and consuming less computational resources.

Based on the static and dynamic analysis of the computer executable function 110, permission profiles determination and management system 200 can be configured to determine a permission profile for the computer executable function 110, the permission profile includes the first permissions (i.e. one or more of: permission A 140-a, permission B 140-b, permission C 140-c, permission D 140-d, . . . , permission N 140-n) and the second permissions (i.e. one or more of: permission A 140-a, permission B 140-b, permission C 140-c, permission D 140-d, . . . , permission N 140-n) and does not include other permissions (i.e. one or more of: permission A 140-a, permission B 140-b, permission C 140-c, permission D 140-d, . . . , permission N 140-n), other than the first permissions (i.e. one or more of: permission A 140-a, permission B 140-b, permission C 140-c, permission D 140-d, . . . , permission N 140-n) and the second permissions (i.e. one or more of: permission A 140-a, permission B 140-b, permission C 140-c, permission D 140-d, . . . , permission N 140-n) (block 340).

In some cases, the permission profile is based on the permissions (i.e. one or more of: permission A 140-a, permission B 140-b, permission C 140-c, permission D 140-d, . . . , permission N 140-n) determined by the static analysis and the permissions (i.e. one or more of: permission A 140-a, permission B 140-b, permission C 140-c, permission D 140-d, . . . , permission N 140-n) determined by the dynamic analysis. In some cases, the permission profile includes a union of the permissions (i.e. one or more of: permission A 140-a, permission B 140-b, permission C 140-c, permission D 140-d, . . . , permission N 140-n) determined by the static analysis and the permissions (i.e. one or more of: permission A 140-a, permission B 140-b, permission C 140-c, permission D 140-d, . . . , permission N 140-n) determined by the dynamic analysis.

Continuing the non-limiting example above, the static analysis identified permission A 140-a, which is a SELECT permission, allowing execution path A 120-a to read the table. The dynamic analysis of the same computer executed function 110, analyzing the lines of code of execution path C 120-c to deduce that resource A 130-a is utilized by these lines of code and identifying that resource A 130-a is utilized in accordance to permission B 140-b, which is an INSERT permission, allowing execution path C 120-c to insert new data into the table. In this example, the permission profile of computer executable function 110 will include both SELECT and INSERT permissions for resource A 130-a.

In addition, the selection of the execution paths (i.e. one or more of: execution path A 120-a, execution path B 120-b, execution path C 120-c, execution path D 120-d, . . . , execution path N 120-n) for the static and dynamic analysis can be directed to specific execution paths (i.e. one or more of: execution path A 120-a, execution path B 120-b, execution path C 120-c, execution path D 120-d, . . . , execution path N 120-n) that are new execution paths (i.e., one or more of: execution path A 120-a, execution path B 120-b, execution path C 120-c, execution path D 120-d, . . . , execution path N 120-n) that did not exist on a previous version of the computer executable function 110 or that changed with respect to the previous version of the computer executable function 110. In these cases, the distinct combination of execution values of the parameters for the dynamic analysis can be determined so that executing the computer executable function 110 results in execution of given execution paths (i.e., one or more of: execution path A 120-a, execution path B 120-b, execution path C 120-c, execution path D 120-d, . . . , execution path N 120-n) of the specific execution paths (i.e. one or more of: execution path A 120-a, execution path B 120-b, execution path C 120-c, execution path D 120-d, . . . , execution path N 120-n) whose static analysis cannot indefinitely identify all required permissions (i.e. one or more of: permission A 140-a, permission B 140-b, permission C 140-c, permission D 140-d, . . . , permission N 140-n) for execution of the computer executable function 110.

After determining the permission profile for the computer executable function 110, the permission profiles determination and management system 200 can be configured to set the permissions of the computer executable function 110 in accordance with the permission profile, by assigning the computer executable function 110 with the first permissions (i.e. one or more of: permission A 140-a, permission B 140-b, permission C 140-c, permission D 140-d, . . . , permission N 140-n) and with the second permissions (i.e.

one or more of: permission A 140-*a*, permission B 140-*b*, permission C 140-*c*, permission D 140-*d*, . . . , permission N 140-*n*) and removing any other permissions (i.e. one or more of: permission A 140-*a*, permission B 140-*b*, permission C 140-*c*, permission D 140-*d*, . . . , permission N 140-*n*) assigned to the computer executable function 110 other than the first permissions (i.e. one or more of: permission A 140-*a*, permission B 140-*b*, permission C 140-*c*, permission D 140-*d*, . . . , permission N 140-*n*) and the second permissions (i.e. one or more of: permission A 140-*a*, permission B 140-*b*, permission C 140-*c*, permission D 140-*d*, . . . , permission N 140-*n*), if any (block 350).

In some cases, permission profile can be set in a segmented way: setting a partial permission profile for each behavior of the computer executable function 110 that the analysis has found enough information to deduce the minimal permissions (i.e. one or more of: permission A 140-*a*, permission B 140-*b*, permission C 140-*c*, permission D 140-*d*, . . . , permission N 140-*n*) required for that given behavior of the computer executable function 110.

It is to be noted that, with reference to FIG. 3, some of the blocks can be integrated into a consolidated block or can be broken down to a few blocks and/or other blocks may be added. Furthermore, in some cases, the blocks can be performed in a different order than described herein (for example, block 330 can be performed before block 320, etc.). It is to be further noted that some of the blocks are optional (for example, block 350 is optional). It should be also noted that whilst the flow diagram is described also with reference to the system elements that realizes them, this is by no means binding, and the blocks can be performed by elements other than those described herein.

FIG. 4 is a flowchart illustrating one example of a sequence of operations carried out for associating behaviors of a computer executable function with risk scores, in accordance with the presently disclosed subject matter.

According to certain examples of the presently disclosed subject matter, permission profiles determination and management system 200 can be configured to perform an associating behaviors of a computer executable function with risk scores process 400, e.g., by permission profiles determination and management system 200 utilizing the permission profiles management module 240.

Associating behaviors of a computer executable function with risk scores process 400 is a continuation of the permission profiles determination and management process 300 as detailed above, with respect to FIG. 3.

As detailed above, the permission profiles determination and management process 300 performs static and dynamic analysis of the computer executable function 110 that determine behaviors of the computer executable function 110. These behaviors are, for example, typically associated with risk scores.

For this purpose, permission profiles determination and management system 200 can be configured to associate detected behaviors of the computer executable function 110 with risk scores, so that a first risk score of detected behaviors detected by the dynamic analysis and not detected by the static analysis is higher than a second risk score of detected behaviors detected by the static analysis (block 410).

In these cases, the risk score associated with a specific behavior is higher when the specific behavior is detected by the dynamic analysis and not detected by the static analysis because the fact that the specific behavior has evaded the static analysis of the computer executable function 110 but was found by the dynamic analysis of the same computer executable function 110 is sign of high risk.

It is to be noted that, with reference to FIG. 4, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Turning to FIG. 5, there is shown a flowchart illustrating one example of a sequence of operations carried out for determining permission profiles for computer executable functions based by utilizing risk scores.

According to certain examples of the presently disclosed subject matter, permission profiles determination and management system 200 can be configured to perform a determining permission profiles for computer executable functions based by utilizing the risk scores process 500, e.g., by the permission profiles determination and management system 200 utilizing the permission profiles management module 240.

Determining permission profiles for computer executable functions based by utilizing risk scores process 500 is a continuation of the permission profiles determination and management process 300 as detailed above, with respect to FIG. 3.

As detailed above, the permission profiles determination and management process 300 performs static and dynamic analysis of the computer executable function 110 to determine a permission profile for the computer executable function 110. The determination of the permission profile may also be based on risk scores.

For this purpose, permission profiles determination and management system 200 can be configured to obtain risk scores associated with respective behaviors of functions 110, and wherein the permission profile is determined utilizing the risk scores (block 510).

In some cases, the permission profile does not include at least one given permission (i.e. one or more of: permission A 140-*a*, permission B 140-*b*, permission C 140-*c*, permission D 140-*d*, . . . , permission N 140-*n*) of the first permissions (i.e. one or more of: permission A 140-*a*, permission B 140-*b*, permission C 140-*c*, permission D 140-*d*, . . . , permission N 140-*n*) or the second permissions (i.e. one or more of: permission A 140-*a*, permission B 140-*b*, permission C 140-*c*, permission D 140-*d*, . . . , permission N 140-*n*), the given permission (i.e. one or more of: permission A 140-*a*, permission B 140-*b*, permission C 140-*c*, permission D 140-*d*, . . . , permission N 140-*n*) resulting from a detected behavior of the computer executable function that is associated with a given risk score of the risk scores that is higher than a threshold.

In some cases, the permission profile does not include at least one given permission (i.e. one or more of: permission A 140-*a*, permission B 140-*b*, permission C 140-*c*, permission D 140-*d*, . . . , permission N 140-*n*) identified as part of the first permissions (i.e. one or more of: permission A 140-*a*, permission B 140-*b*, permission C 140-*c*, permission D 140-*d*, . . . , permission N 140-*n*) and not identified as part of the second permissions (i.e. one or more of: permission A 140-*a*, permission B 140-*b*, permission C 140-*c*, permission D 140-*d*, . . . , permission N 140-*n*), or identified as part of the second permissions (i.e. one or more of: permission A 140-*a*, permission B 140-*b*, permission C 140-*c*, permission D 140-*d*, . . . , permission N 140-*n*) and not identified as part of the first permissions (i.e. one or more of: permission A 140-*a*, permission B 140-*b*, permission C 140-*c*, permission D 140-*d*, . . . , permission N 140-*n*), wherein the given permission (i.e. one or more of: permission A 140-*a*, permission B 140-*b*, permission C 140-*c*, permission D 140-*d*, . . . , permission N 140-*n*) is associated with a behavior that is associated with a risk score higher than a threshold.

It is to be noted that, with reference to FIG. 5, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

For example, any combination of one or more non-transitory computer readable (storage) medium(s) may be utilized in accordance with the above-listed embodiments of the present disclosed subject matter. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

Although the disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computer system for determining permission profiles for computer executable functions, comprising:
   a non-transitory storage medium for storing computer components; and,
   a computerized processor for executing the computer components, the computer components comprising at least one module for:
   performing a static analysis of a computer executable function to identify first permissions required for operation of the computer executable function, wherein the computer executable function has associated therewith a plurality of input parameters and wherein the static analysis is performed without executing the computer executable function and irrespectively of values of the input parameters;
   performing a dynamic analysis of the computer executable function by executing the computer executable function a plurality of times, each time with a distinct combination of execution values of the input parameters, to identify second permissions required for operation of the computer executable function that are not identified by performing the static analysis;
   determining a permission profile for the computer executable function, the permission profile including the first permissions and the second permissions; and
   associating detected behaviors of the computer executable function with risk scores that includes at least a first risk score and a second risk score, wherein the first risk score is associated with detected behaviors detected by the dynamic analysis and not detected by the static analysis, and wherein the second risk score is associated with detected behaviors detected by the static analysis, and wherein the first risk score is higher than the second risk score.

2. The computer system of claim 1, wherein the at least one module is further configured to set the permissions of the computer executable function in accordance with the permission profile, by assigning the computer executable function with the first permissions and with the second permissions and removing any other permissions assigned to the computer executable function other than the first permissions and the second permissions, if any.

3. The computer system of claim 1, wherein the computer executable function comprises a plurality of lines of code and a plurality of execution paths selectable in accordance with the values of one or more of the input parameters, each execution path includes execution of a distinct subset of the lines of code, and wherein the distinct combination of execution values of the parameters is selected such that the static analysis of the execution paths cannot identify all required permission for execution of the computer executable function.

4. The computer system of claim 1, wherein the dynamic analysis is performed by executing the computer executable function in at least one of: a) a test environment; or, b) an operational environment.

5. The computer system of claim 1, wherein the permission profile is determined utilizing the risk scores.

6. The computer system of claim 1, wherein the computer executable function comprises a plurality of lines of code and a plurality of execution paths selectable in accordance with the values of one or more of the input parameters, each execution path includes execution of a distinct subset of the lines of code, and wherein a subset of the execution paths are new execution paths that did not exist on a previous version of the computer executable function or that changed with respect to the previous version of the computer executable function, and wherein the subset of execution paths is executed.

7. The computer system of claim 1, wherein the computer executable function is at least one of: a) a serverless function executable on a Function as a Service (FaaS) platform; or, b) a container executable on a managed containers environment.

8. The computer system of claim 1, wherein the permission profile does not include permissions other than the first permissions and the second permissions.

9. A method for determining permission profiles for computer executable functions, the method comprising:
performing, by a processing resource, a static analysis of a computer executable function to identify first permissions required for operation of the computer executable function, wherein the computer executable function has associated therewith a plurality of input parameters and wherein the static analysis is performed without executing the computer executable function and irrespectively of values of the input parameters;
performing, by the processing resource, a dynamic analysis of the computer executable function by executing the computer executable function a plurality of times, each time with a distinct combination of execution values of the input parameters, to identify second permissions required for operation of the computer executable function that are not identified by performing the static analysis;
determining, by the processing resource, a permission profile for the computer executable function, the permission profile including the first permissions and the second permissions; and
associating detected behaviors of the computer executable function with risk scores that includes at least a first risk score and a second risk score, wherein the first risk score is associated with detected behaviors detected by the dynamic analysis and not detected by the static analysis, and wherein the second risk score is associated with detected behaviors detected by the static analysis, and wherein the first risk score is higher than the second risk score.

10. The method of claim 9, further comprising setting, by the processing resource, the permissions of the computer executable function in accordance with the permission profile, by assigning the computer executable function with the first permissions and with the second permissions and removing any other permissions assigned to the computer executable function other than the first permissions and the second permissions, if any.

11. The method of claim 9, wherein the computer executable function comprises a plurality of lines of code and a plurality of execution paths selectable in accordance with the values of one or more of the input parameters, each execution path includes execution of a distinct subset of the lines of code, and wherein the distinct combination of execution values of the parameters is selected such that the static analysis of the execution paths cannot identify all required permission for execution of the computer executable function.

12. The method of claim 9, wherein the dynamic analysis is performed by executing the computer executable function in at least one of: a) a test environment;
or, b) an operational environment.

13. The method of claim 9, wherein the permission profile is determined utilizing the risk scores.

14. The method of claim 9, wherein the computer executable function comprises a plurality of lines of code and a plurality of execution paths selectable in accordance with the values of one or more of the input parameters, each execution path includes execution of a distinct subset of the lines of code, and wherein a subset of the execution paths are new execution paths that did not exist on a previous version of the computer executable function or that changed with respect to the previous version of the computer executable function, and wherein the subset of execution paths is executed.

15. The method of claim 9, wherein the computer executable function is at least one of: a) a serverless function executable on a Function as a Service (FaaS) platform; or, b) a container executable on a managed containers environment.

16. The method of claim 9, wherein the permission profile does not include permissions other than the first permissions and the second permissions.

17. A non-transitory computer readable storage medium having computer readable program code embodied therewith, the computer readable program code, executable by at least one processor of a computer to perform the steps of:
performing a static analysis of a computer executable function to identify first permissions required for operation of the computer executable function, wherein the computer executable function has associated therewith a plurality of input parameters and wherein the static analysis is performed without executing the computer executable function and irrespectively of values of the input parameters;
performing a dynamic analysis of the computer executable function by executing the computer executable function a plurality of times, each time with a distinct combination of execution values of the input parameters, to identify second permissions required for operation of the computer executable function that are not identified by performing the static analysis;
determining a permission profile for the computer executable function, the permission profile includes the first permissions and the second permissions; and
associating detected behaviors of the computer executable function with risk scores that includes at least a first risk score and a second risk score, wherein the first risk score is associated with detected behaviors detected by the dynamic analysis and not detected by the static analysis, and wherein the second risk score is associated with detected behaviors detected by the static analysis, and wherein the first risk score is higher than the second risk score.

18. The non-transitory computer readable storage medium of claim 17, wherein the permission profile does not include permissions other than the first permissions and the second permissions.

19. The computer system of claim 1, wherein the computer executable function comprises a plurality of lines of code and a plurality of execution paths selectable in accordance with the values of one or more of the input parameters, each execution path includes execution of a distinct segment of the lines of code, and each distinct segment having a distinct set of permissions.

20. The method of claim 9, wherein the computer executable function comprises a plurality of lines of code and a plurality of execution paths selectable in accordance with the values of one or more of the input parameters, each execution path includes execution of a distinct segment of the lines of code, and each distinct segment having a distinct set of permissions.

* * * * *